United States Patent [19]

Mononen

[11] 3,985,250

[45] Oct. 12, 1976

[54] VEHICLES FOR TAKING ON, TRANSPORTING, AND DISCHARGING A LOAD

[76] Inventor: Sakari Matti Mononen, Salkolantie 3 A 15, Nurmijarvi, Finland, 01900

[22] Filed: June 19, 1975

[21] Appl. No.: 588,349

[30] Foreign Application Pricrity Data

June 20, 1974 Finland .............................. 1909/74
May 14, 1975 Finland .............................. 1427/75

[52] U.S. Cl. ............................ 214/146 R; 214/501; 298/22 J; 214/147 R
[51] Int. Cl.² ........................................... E02F 3/28
[58] Field of Search ................. 214/501, 78, 130 A, 214/130 R, 141, 146 R, 149, DIG. 4, 144, 145, 147 R; 298/17 B, 22 J, 22 R

[56] References Cited
UNITED STATES PATENTS

| | | | |
|---|---|---|---|
| 2,317,075 | 4/1943 | McFarland | 214/141 X |
| 3,794,191 | 2/1974 | Kuhn | 214/146 R |

Primary Examiner—Albert J. Makay
Attorney, Agent, or Firm—Steinberg and Blake

[57] ABSTRACT

A self-loading vehicle having an elongated horizontal frame to one end of which is connected a vehicle-propelling structure while at the other end region of the frame there is a bell crank structure pivoted to the frame for turning about a bell crank axis which extends horizontally and transversely with respect to the direction of vehicle travel. The bell crank has, when the vehicle is in a load-transporting mode, an upright arm extending upwardly from the bell crank axis and a substantially horizontal arm extending from the bell crank axis toward the vehicle-propelling structure. This latter upright arm is pivotally connected distant from the bell crank axis to a load-carrying structure so that the latter can turn with respect to the upright arm about a discharge axis which is parallel to the bell crank axis. Thus the bell crank can be turned about the bell crank axis to place the vehicle in a load-receiving and a load-transporting mode while the load-carrying structure can be turned about the discharge axis to place the vehicle in a load-discharging mode.

11 Claims, 12 Drawing Figures

VEHICLES FOR TAKING ON, TRANSPORTING, AND DISCHARGING A LOAD

BACKGROUND OF THE INVENTION

The present invention relates to vehicles, particularly of the type which are self-loading and which are capable of transporting and discharging the load which the vehicle takes on.

Such a vehicle will have an elongated frame at one end of which is the propelling structure for providing the required traction and steering of the vehicle while at the other end there is the structure for receiving, carrying, and discharging the load.

Conventionally, in order to transport loads of any desired characteristics from one location to another it is required to have a wheeled loading vehicle forming a wheel loader and a separate transporting vehicle which receives the load from the wheel loader. One of the drawbacks encountered when using such a wheel loader is that the friction between the wheels of the loader and the surface engaged thereby exerts a significant influence on the pushing force of the loader and thereby on the extent to which its scoop can be filled. Thus, under certain operating conditions the wheels of the loader engage a slippery soft surface which detracts undesirably from the friction required for efficient operation of the loader. In addition, the wheels tend to sink into such a soft surface with an accompanying increase in the resistance to rolling of the wheels. A further drawback of such wheel loaders arises from difficulties encountered when working on sloping terrain and when encountering unfavorable weight distribution.

Also, when utilizing separate loaders and transporting conveyances, there is an unavoidable and costly standing time when a vehicle which is to transport a load must wait until it receives the load. Such expensive waiting time is particularly noticeable in the event that, for example, the loader breaks down while a vehicle waits its turn to be loaded. Under such conditions the operating or working cycles of several vehicles are undesirably interrupted.

Furthermore, wheel loaders of the above type can only operate when there is sufficient space for the loader to move around both with respect to the load as well as with respect to the vehicle which is to receive the load. As a result when operating in relatively confined spaces, such as in the interior of a tunnel, significant disadvantages are encountered with such conventional procedures and structures.

SUMMARY OF THE INVENTION

It is accordingly a primary object of the present invention to provide a vehicle structure which will avoid the above drawbacks.

In particular, it is an object of the present invention to provide a vehicle structure which will in many cases enable the vehicle to load itself without requiring the use of a separate loading vehicle.

In addition it is an object of the present invention to provide a self-loading vehicle which can transport and then discharge the load which it takes on and which is more economical and more versatile than previously known vehicles.

A further object of the present invention is to provide a structure which may be used not only in connection with loading of a vehicle but also if necessary to move the vehicle with respect to terrain in which the vehicle is stuck on the conditions which otherwise would require the vehicle to be pulled or pushed from its position by another vehicle.

A further object of the present invention is to provide a vehicle of the above type which can readily be adapted for use with different types of load carriers.

Also it is an object of the present invention to provide a vehicle of the above type with the capability of carrying out operations through much larger ranges than has heretofore been possible.

Also it is an object of the present invention to provide a vehicle which need only move the load through an extremely short distance from the original location of the load to the location of the load during transport thereof.

Also it is an object of the present invention to provide a vehicle where the load-receiving component can move directly along the ground so as to provide superior loading operations as compared with a situation where the load carrier must always be elevated above the ground, so that the load must be raised into the load carrier.

In addition it is an object of the present invention to provide a structure which is capable of handling a load in the form of large one-piece objects such as large stones which may have a weight up to the entire transporting capacity of the vehicle.

Also it is an object of the present invention to provide a vehicle which can operate in a space the length of which is no greater than the width required for the travel of the vehicle itself, so that the vehicle of the invention can operate under extremely confined conditions as, for example, in tunnels.

Furthermore, it is an object of the present invention to provide a vehicle which can operate under conditions where the friction between the vehicle and the surface on which it is supported or the inclination of the terrain cannot decisively influence the efficiency of the loading operations.

In addition it is an object of the present invention to provide a vehicle according to which an exceedingly favorable weight distribution can be achieved in such a way that an extremely large useful load can be carried with the useful load having a magnitude which may be substantially the same as the weight of the vehicle itself. This feature is in sharp contrast with a wheel loader, for example, which at most can only handle a weight equal to approximately ⅓ of the weight of the wheel loader itself.

In addition, it is an object of the present invention to provide a structure of the above type which can be interchangeably used with different types of load-carriers so that a load carrier can take the form, on the same vehicle, of a container for relatively loose material, while this container may be replaced by other structure such as grabbing structure of the type used to grab logs, for example. With the structure of the invention there is situated at one end of the body structure of the vehicle a pivotal bell crank means capable of turning about a substantially horizontal bell crank axis which is transverse with respect to the direction of vehicle travel. The bell crank means has arms to one of which the load-carrying structure is pivotally connected so as to be turnable with respect to the latter arm for the purpose of emptying or discharging the load. The other arm of the bell crank means extends horizontally when the vehicle is in a load-transporting mode and may be situated at least in part within the wheel base of the vehicle, the bell crank means being turnable so as to place the vehicle in a load-receiving mode.

Furthermore, it is possible to increase lifting height of the vehicle loading structure by additional pivot structures while the horizontal range of operation can also be increased in the same way. These features, enable, if required, the vehicle to be pushed free of terrain in which it has become bogged, by utilizing the hydraulic structure which normally is used for the purpose of operating the load-carrying structure.

Thus, the self-loading vehicle of the invention has elongated substantially horizontal frame means provided with a pair of opposed end regions. A propelling means is operatively connected with one of these end regions to propel the vehicle, this propelling means having at least a pair of wheels to engage the surface on which the vehicle travels. At least one additional pair of wheels are connected to the other end region of the frame means to support the vehicle during travel thereof. A bell crank means is pivotally connected with this other end region of the frame means to turn with respect thereto about a substantially horizontal bell crank axis which extends transversely with respect to the direction of vehicle travel. The bell crank means has a pair of arm means which are substantially perpendicular with respect to each other and which are connected to each other at the region of the bell crank axis. One of these arm means is an operating arm means which extends from the bell crank axis toward the above one end region of the frame means where the propelling means is located, with this operating arm means having a substantially horizontal attitude when the vehicle is in a load-transporting mode. The other arm means is a carrying arm means which extends upwardly from the bell crank axis when the vehicle is in this load-transporting mode. A load-carrying means is pivotally connected to the carrying arm means for turning movement with respect thereto about a discharge axis which is parallel to the bell crank axis and which is situated at an elevation substantially higher than the bell crank axis when the vehicle is in its load-transporting mode. The load-carrying means has a load-carrying position where the load-carrying means extends at least in part from the discharge axis downwardly toward the operating arm means while the vehicle is in the load-transporting mode. A bell-crank displacing means is operatively connected between the operating arm means and the frame means for turning the bell crank means about the bell crank axis to a position where the operating arm means extends upwardly from the bell crank axis while the carrying arm means extends from the bell crank axis away from the propelling means so as to place the vehicle in a mode for taking on a load while at the same time placing the load-carrying means in a load-receiving position. A load-carrier displacing means is operatively connected between the load-carrying means and the bell crank means for turning the load-carrying means about the above discharge axis while the carrying arm means extends upwardly from the bell crank axis so as to place the vehicle in a load-discharging mode while turning the load-carrying means with respect to the bell crank means to a load-discharging position.

BRIEF DESCRIPTION OF DRAWINGS

The invention is illustrated by way of example in the accompanying drawings which form part of this application and in which.

DESCRIPTION OF PREFERRED EMBODIMENTS

In the embodiments of the invention which are illustrated in FIGS. 1–7, the vehicle has a load-carrying means in the form of a container 1 which, when the vehicle is in a load-transporting mode may have an upper open end while when the vehicle is in a mode for taking on a load, the open end of the container is directed toward the load while the loading operation is in progress.

Figure 3A:
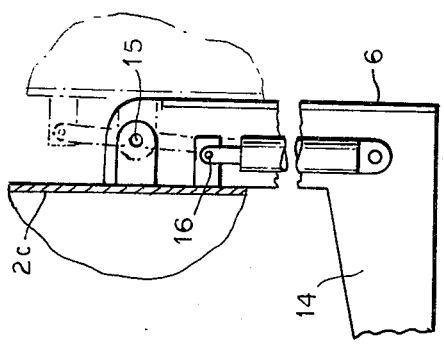
FIG. 3A is a fragmentary schematic illustration of the manner in which the load-carrying container of FIGS. 1–3 is turned from the load-carrying position of FIG. 2 into the load-discharging position of FIG. 3.
Figure 1:
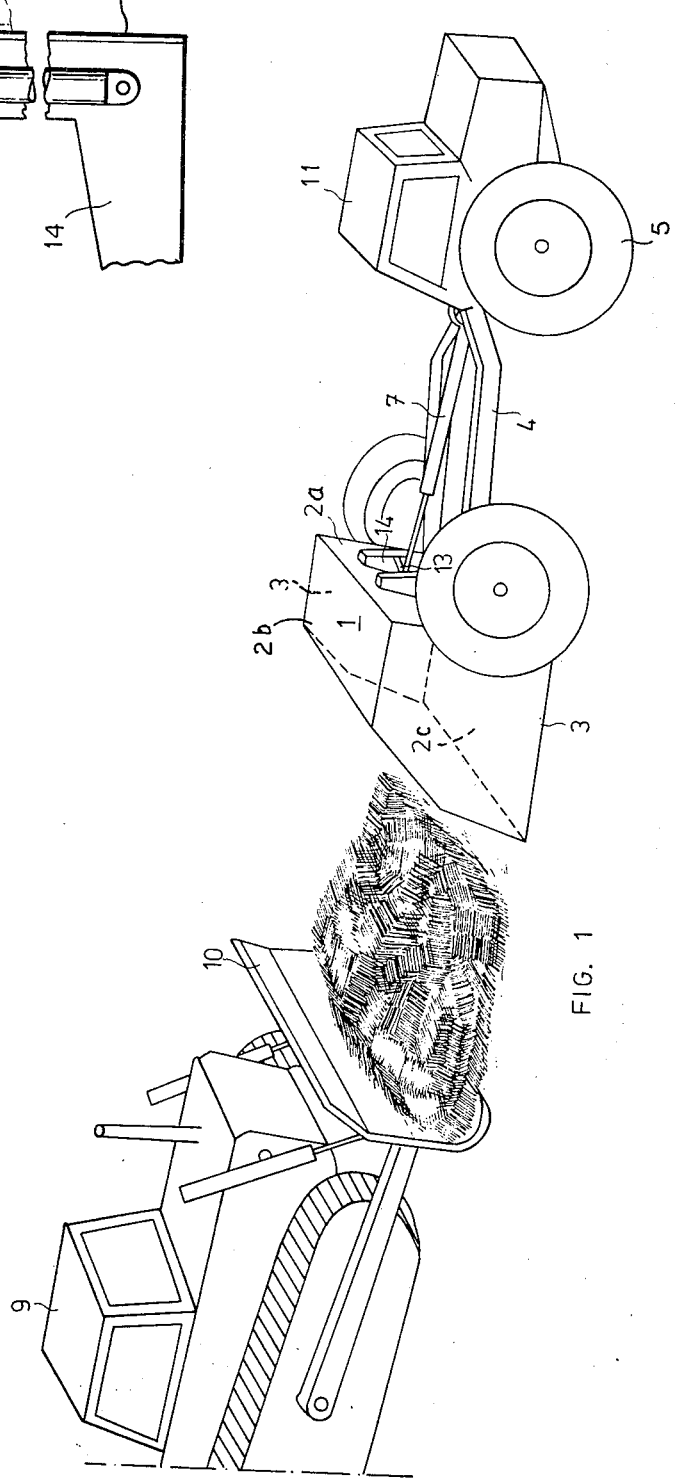
FIG. 1 is a simplified schematic perspective illustration of a vehicle according to the invention shown in a load-receiving mode with a tractor being shown in FIG. 1 to facilitate the loading operations.
Figure 2:
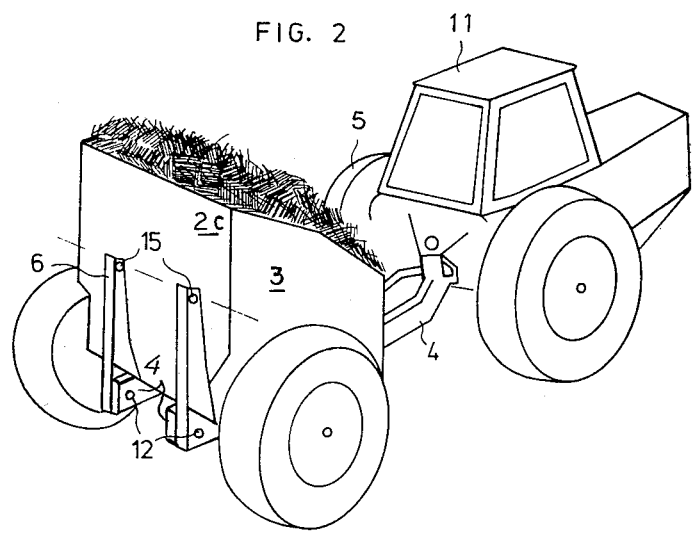
FIG. 2 is a schematic perspective illustration of the vehicle of the invention of FIG. 1 as shown when viewed from the rear and in the condition where the vehicle is in a load-transporting mode.
Figure 3:
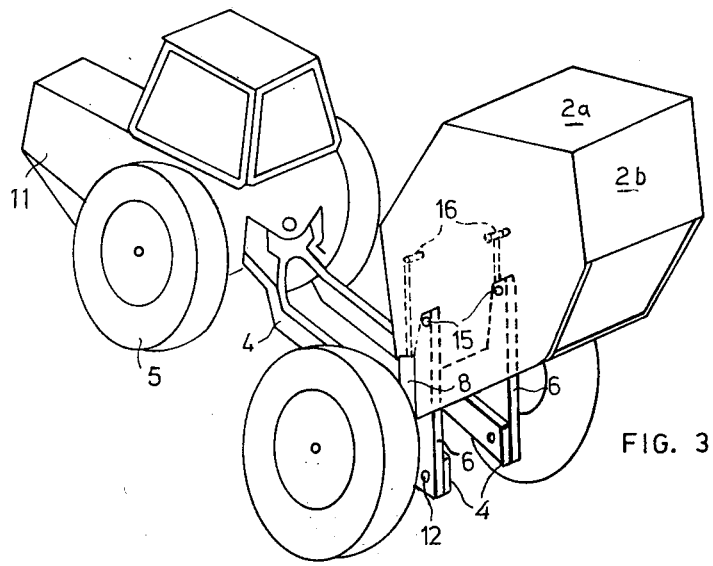
FIG. 3 is also a perspective schematic illustration of the vehicle of FIGS. 1 and 2 from the rear with FIG. 3 showing the vehicle in a load-discharging mode.

The container 1 of FIGS. 1–3 has opposed end walls 3 which extend generally in the direction of vehicle travel. These opposed end walls are interconnected by a transversely extending bottom wall 2a as well as a pair of opposed transverse walls 2b and 2c. It will be noted that the wall 2b is shorter than the wall 2c, with the latter forming the rear wall of the container and extending in an upright attitude when the vehicle is in the load-transporting mode of FIG. 2. With respect to FIGS. 4–7, however, the container 1, while having the opposed end walls 3 which extend generally in the direction of travel and which are parallel to each other has only a single curved wall 2 which forms the container with the walls 3, the wall 2 having an inner concave surface defining with the walls 3 the interior of the container 1 of FIGS. 4–7.

Thus, the load carrying means of FIGS. 4–7 may have a generally scoop-shaped configuration.

The vehicle has a robust elongated horizontally extending frame means 4 which in the illustrated example has a propelling means 11 operatively connected to its front end region, the propelling means including at least a pair of front wheels 5 in the illustrated example. Thus, the propelling means 11 can include any suitable engine as well as a cab for the vehicle operator and of course the wheels 5 to support the vehicle during travel thereof. At an opposed rear end region of the frame means 4 of the vehicle there are at least one additional pair of wheels as illustrated in order to support the vehicle during travel thereof. The vehicle may appropriately be one that is body-pivot steered, and to a large extent it may be of a standard design.

In the example of FIG. 1 there is pivotally connected to the rear end region of the frame means 4 a bell crank means 6, 14. In the particular example illustrated the bell crank means includes a pair of separate bell cranks which are fixed to each other so as to operate in synchronism, these bell cranks being connected by way of pivots 12 to the rear end region of the frame means 4 so as to turn about the common bell crank axis formed by the pivots 12. As is apparent from FIG. 2, in the load-transporting mode the arms 6 extend upwardly from the bell crank axis, these arms 6 forming a carrying arm means for the bell crank means inasmuch as the arm 6 serve by way of pivots 15 to carry the load-carrying means 1. In the load-transporting mode shown in FIG. 2, the arms 14 of the bell crank means, which form an operating arm means, extend substantially horizontally from the bell crank axis toward the front end region of the frame means 4. As is apparent from FIG. 1, the pair of bell crank arms 14 are fixed to each other by way of a transverse bar 13 which in turn is pivotally connected to a piston rod of a hydraulic unit 7 whose cylinder is pivotally connected to the front end region of the frame means 4. This unit 7 forms a bell crank displacing means which may be extended to the position shown in FIG. 1 in order to turn the bell crank means 6, 14 about the bell crank axis into a position for placing the vehicle in a mode for taking on a load. In this position shown in FIG. 1, the operating arm means 14 extends upwardly from the bell crank axis while the carrying arm means 6, not visible in FIG. 1, extends rearwardly away from the front end of the frame means 4.

With the load-carrying means 1 in the position shown in FIG. 1, which is the mode for taking on a load, the loading operations can be carried out for example by way of a scoop 10 operated by a tractor 9 which is capable of pushing the material into the container 1 in the position of the part shown in FIG. 1. Of course, instead of using the tractor structure 9, 10 it is possible also simply to place the vehicle in reverse when it is in the mode for receiving a load and thus to push the load-carrying means 1 directly into the load, which may be a pile of gravel, for example, so that in this way a self-loading operation can be carried out.

Assuming that the load has thus become situated in the interior of the container 1, then in order to place the vehicle in the mode for transporting the load, as shown in FIG. 2, it is only necessary to operate the bell crank displacing means 7 so as to swing the bell crank means from the position of FIG. 1 into the position of FIG. 2. Now the vehicle is in its load-transporting mode where the arms 14 extend horizontally and the arms 6 extend upwardly. It is to be noted that the bell cranks 6, 14 can be situated at least to small extent inwardly of the planes occupied by the end walls 3 so that the wall 2c can directly engage the arms 6 while the bottom wall 2a can directly engage the arms 14 when the vehicle is in the load-transporting mode of FIG. 2. In addition it is to be noted that in the load-transporting mode of FIG. 2 the center of gravity of the load is within the wheel base of the vehicle so that an extremely stable support for the load is achieved.

As is apparent from the above, the pivots 12 provide for the bell crank means a horizontal pivot axis, extending perpendicularly across the direction of vehicle travel, and situated at a relatively low elevation as determined by the frame means 4. This situation of the bell crank axis is one of the important features of the present invention.

As was indicated above, the wall 2c of the load-carrying means 1 of FIGS. 1–3 is pivotally connected to the upper end regions of the arms 6 as viewed in FIG. 2, by way of pivots 15. These pivots 15 provide for the load-carrying means 1 a discharge axis which is parallel to the bell crank axis determined by the pivots 12. As is apparent from FIG. 2, when the vehicle is in its load-transporting mode, the discharge axis determined by the coaxial pivots 15 is at an elevation substantially higher than the bell crank axis. The container 1 is connected to the bell cranks only at the pivots 15 so that the container 1 is turnable with respect to the bell cranks about the discharge axis determined by the pivots 15.

As is shown schematically in FIG. 3 and as is indicated fragmentarily and schematically in FIG. 3A, the arms 6 respectively carry hydraulic units 8 the cylinders of which are pivotally connected to the arms 6 and the pistons of which are pivotally connected with suitable brackets which are fixed to and project from the wall 2c. This wall 2c carries additional brackets which are pivotally connected with the pivots 15 carried by the arms 6. This arrangement is such that when a hydraulic fluid under pressure is fed to the cylinders of the units 8, these units will become extended and will turn the container 1 through substantially 180° so that the wall 2c instead of being situated at the front of the arms 6 in the transport mode of FIG. 2 become situated at the rear of the arms 6 in the load-discharging mode of FIG. 3. This operation is clearly apparent from FIG. 3A. Of course the units 8 are displaced laterally with respect to the pivots 15 and the brackets connected thereto by a distance sufficient to permit the full extension to take place in the manner shown in FIG. 3A. If desired a single rod can extend between the arms 6 and carry substantially midway between the latter a single unit 8 pivotally connected to a bracket fixed to the wall 2c so that in this way a single operating unit 8 may be used to turn the load-carrying means 1 about the load-discharge axis from the transport mode of FIG. 2 into the discharge mode shown in FIG. 3.

Thus, with the above construction there is the advantage that the container 1 is unloaded from an elevation which is at a considerable height above the ground. This is a further important feature of the present invention.

Figure 4:
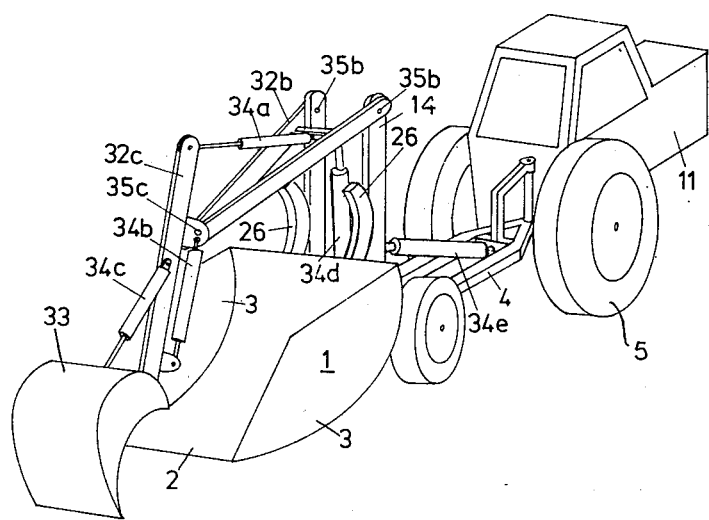
FIG. 4 is a perspective schematic illustration of another embodiment of a vehicle according to the invention as seen from the rear with the vehicle being shown in its mode for taking on a load.
Figure 5:
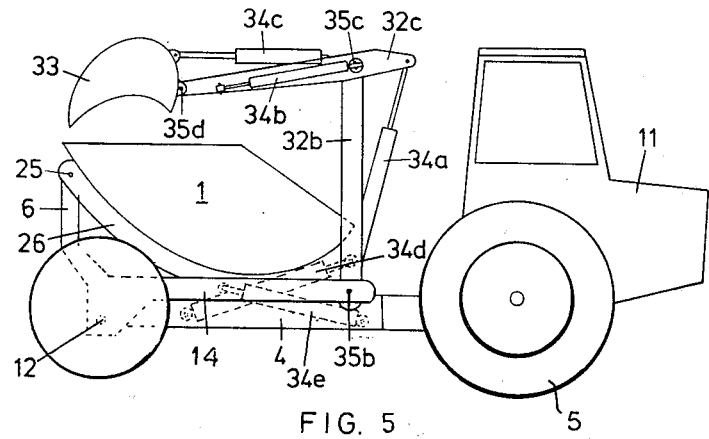
FIG. 5 shows in a schematic side view the structure of FIG. 4 in its load-transporting mode.
Figure 6:
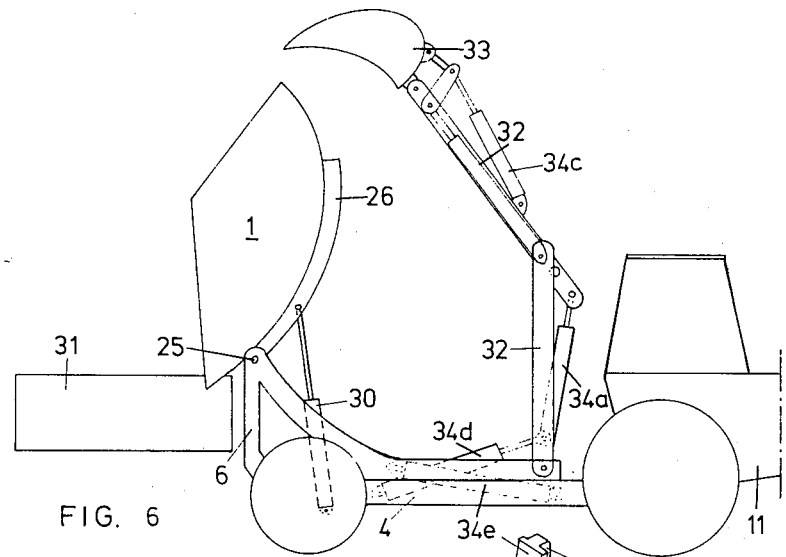
FIG. 6 is a schematic side elevation of the structure of FIGS. 4 and 5 in a load-discharging mode.

As has been indicated above, the load-carrying means of FIGS. 4–7 takes the form of a container 1 which has a curved wall 2. With this construction the arms 6 and 14 of the bell crank means can be interconnected by a curved reinforcing strut as is apparent from FIG. 7. This embodiment of the invention has a load-moving means 33 in the form of a scoop which of course may also be used with the embodiment of FIGS. 1–3 if desired. This scoop 33 is interconnected with the bell crank means by way of a linkage composed of a pair of link arms 32b pivotally connected by way of pivots 35b with the ends of the bell crank arms 14 distant from the bell crank axis 12. These linkage arms 32b are connected in common to a bracket which extends from a link arm 32c, this pivotal connection of the arms 32b with the arm 32c being provided by way of a pivot 35c. The arm 32c is pivotally connected directly with the scoop 33 by way of a pivot 35d. When the vehicle is in the mode for receiving a load as shown in FIG. 4, the bell crank arms 14 of course extend upwardly and the link arms 32b will now extend from the pivots 35b substantially horizontally and forwardly, so that the linkage which carries the scoop 33 turns together with the bell crank means as is apparent from a comparison of FIGS. 4 and 5. Thus in the position of the parts shown in FIG. 4 it is possible to operate the scoop 33 in a manner described in greater detail below so as to be capable of moving material into the container 1. A hydraulic unit 34d is provided for turning the arms 32b about the pivots 35b with respect to the bell crank arms 14, in the manner which is clearly apparent from FIGS. 4–6. In addition, the arm 32c is capable of being turned about the pivot 35c with respect to the arms 32b by way of the hydraulic unit 34a in a manner apparent from the drawings. In addition, the scoop itself is capable of being returned with respect to the pivot 35d at the end of the arm 32c by way of a further hydraulic unit 34c. By way of a hydraulic unit 34b it is possible to achieve a certain amount of lateral adjustment of the scoop. In FIG. 6 the hydraulic unit 34c is shown at being interconnected with the scoop by way of an additional pivotal link as apparent from the upper portion of FIG. 6.

Thus, by way of the above structure it is possible to achieve an extremely flexible operation of the load-moving means 33 for the purpose of displacing a load into the container 1.

Figure 7:
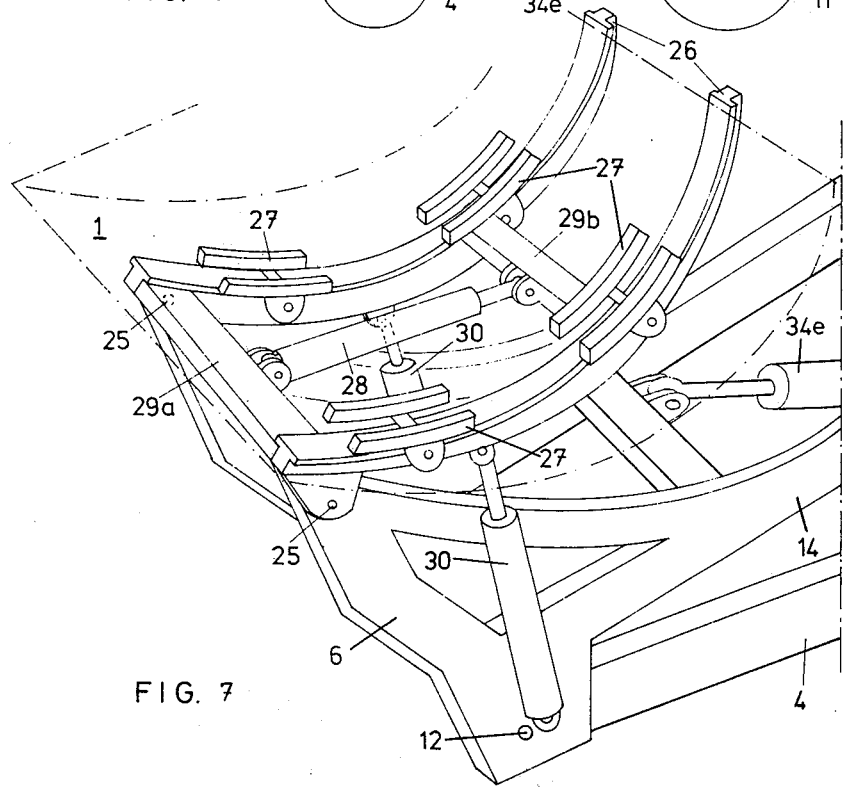
FIG. 7 is a fragmentary perspective illustration of details of the embodiment of FIGS. 4–6.

In the embodiment of FIGS. 4–7, the bell-crank displacing means takes the form of the hydraulic unit 34e which is pivotally connected at one end to the frame and at its opposite end to a bar extending between the bell cranks, as shown most clearly in FIG. 7.

However, with this embodiment the container 1 is not connected directly with the ends of the arms 6 distant from the bell crank axis determined by the pivots 12. Instead the container 1 is carried by a pair of curved guiding tracks 26 which form a guide means to permit the container 1 to be further moved to an extended position as described below. As may be seen from FIG. 7, the outer convex surface of the curved wall 2 of the container 1 is fixed with slidable and rolling guides 27 which are capable of sliding and rolling along the curved guides 26 which are fixed to each other by a transverse bar 29a and which are pivotally connected by way of pivots 25 to the arms 6, so that in this embodiment it is the pivots 25 which determine the discharge axis. A pair of hydraulic units 30 are interconnected between the bell crank and the curved guides 26 so as to swing the latter in unison about the common discharge axis formed by the pivots 25, in the manner which is most clearly apparent from FIGS. 6 and 7. Thus, the units 30 form the means for turning the container means 1 about the discharge axis so as to achieve the discharge mode shown in FIG. 6 where a load is shown being discharged into a load-receiving unit 31.

In the embodiment of FIGS. 4–7, the pair of front movable guide members 27 are interconnected by a bar 29b, and a hydraulic unit 28 extends between the transverse bars 29a and 29b so that through the unit 28 it is possible to move the container 1 along the guide rails 26. In this way when the structure is in the mode of FIG. 4 for taking on a load, it is possible to contract the hydraulic unit 28 so as to shift the container 1 downwardly along the guides 26, shown projecting above the container 1 in FIG. 4, thus enabling the lower edge of the container 1 to have an extremely favorable position with respect to a load. Once the load is received in the container 1, the unit 28 can be expanded so as to retract the container 1 back to its initial position with respect to the curved guides 26, and then the structure can be returned to the load-transporting mode of FIG. 5.

Figure 8:
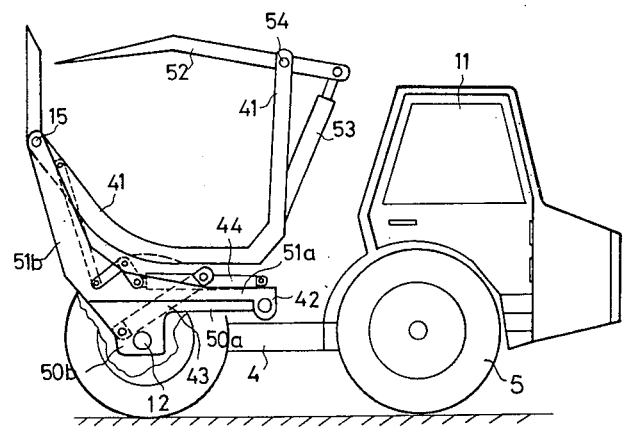
FIG. 8 is a schematic side elevation of a further embodiment of a vehicle according to the invention shown in FIG. 8 in a load-transporting mode.
Figure 9:
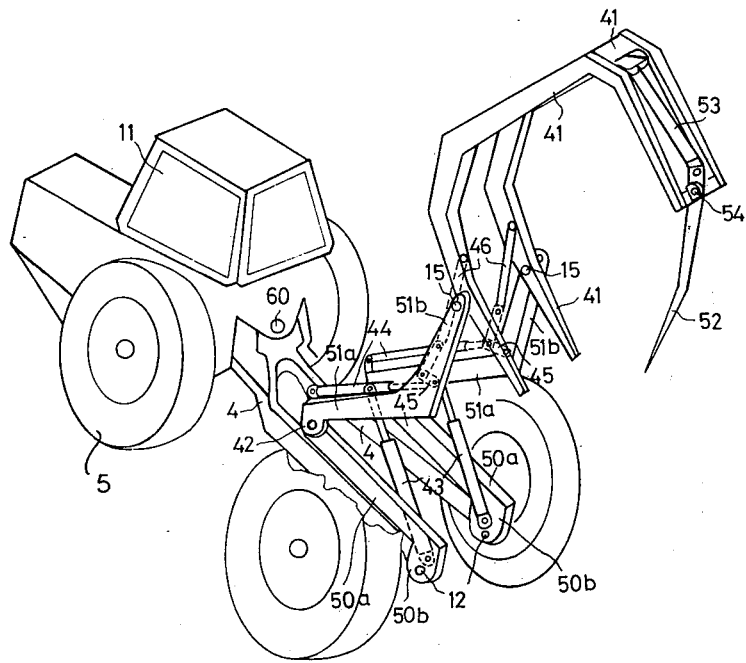
FIG. 9 is a schematic rear perspective illustration of the structure of FIG. 8 shown in a load-discharging mode.

According to the embodiment of the invention which is shown in FIGS. 8–11, the bell crank means has a somewhat different construction although it is still connected by way of pivots 12 to the rear end region of the frame means 4, these pivots 12 forming the bell crank axis about which the bell crank means turns in a manner described above. FIG. 9 shows a pivotal connection 60 between the front end of the frame 4 and the propelling means 5, 11 so that the vehicle is run according to which the propelling means can swing about a vertical axis at the front end of the frame 4.

Figure 10:
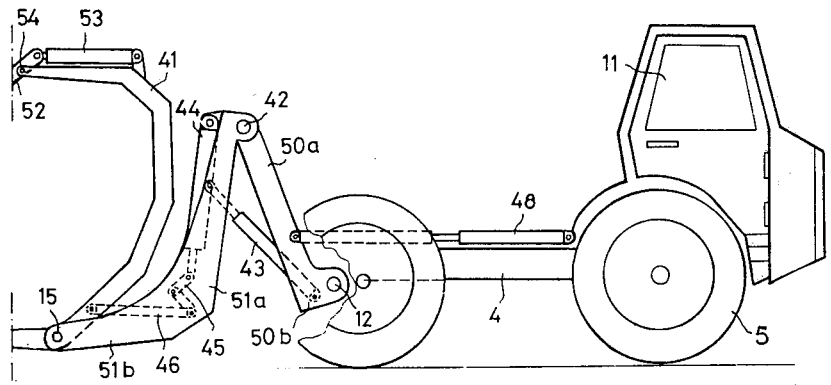
FIG. 10 is a schematic side elevation illustrating the embodiments of FIGS. 8 and 9 when the vehicle is in a mode for taking on a load.
Figure 11:
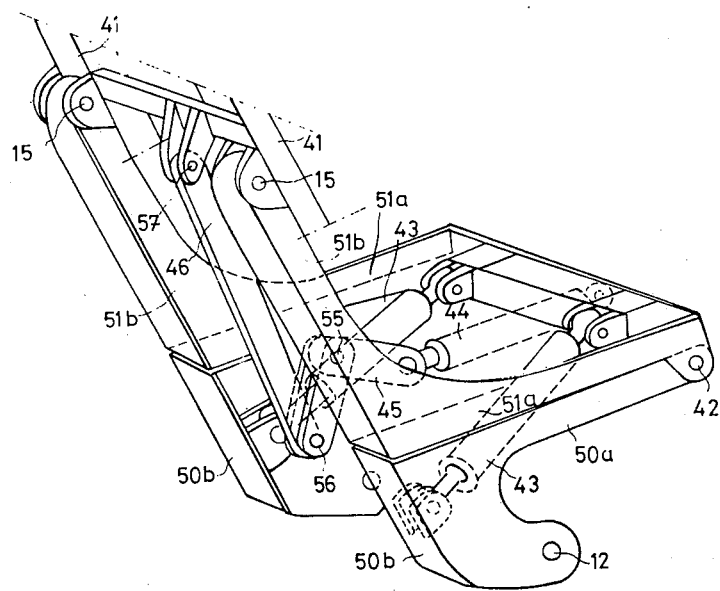
FIG. 11 is a perspective illustration of details of the embodiment of FIGS. 8–10.

In the embodiment of FIGS. 8–11, the operating arm means 14 is replaced by a special operating arm means having in the transporting mode shown in FIG. 11, at each bell crank unit, an upper arm portion 51a and a lower arm portion 50a. These upper and lower arm portions of the operating arm means are pivotally connected to each other by way of a pivot structure 42 which forms a pivot axis parallel to the bell crank axis determined by the pivots 12. It is only the lower arm portions 50a which are connected by way of extensions 50b to the pivot 12 while the upper arm portions 51b corresponding to the bell crank arms 6 of the other embodiments are connected only to the upper portions 51a of the operating arm means of the embodiment of FIGS. 8–11. Thus it will be seen that this construction provides an equivalent of the bell crank structure described above with the added possibility of enabling the arm portions 51a to swing about the pivots 42 toward and away from the arm portions 50a.

In the example of FIGS. 8–11, the load-carrying means takes the form of a grabber means 41 which in the illustrated example is a timber grabber having a substantially U-shaped frame structure connected by way of the pivots 15 to the upper ends of the arms 51b when the vehicle is in the transporting mode of FIG. 8.

As a result of the above-described construction of the bell crank means of FIGS. 8–11, it is possible for the range of movement of the load-carrying means, namely the grabber 41 in this embodiment, to be considerably extended as compared with the other embodiments. This is apparent from FIG. 10. Also, the elevation of the bell crank means can be extended when the structure is in the load-discharging mode of FIG. 9, as a result of the same feature. It will be noted that hydraulic units 43 are interconnected between the lower arm portions 50a and the upper arm portions 51a so as to swing these upper arm portions 51a away from or back toward the lower arm portions 50a, so as to achieve in this way the extended range of operation apparent from FIGS. 9 and 10. Thus in the case of FIG. 9 the extension of units 43 enables the height of the discharge axis determined by the pivots 15 to be increased, while in the case of FIG. 10 the extension of the units 43 enables the horizontal range of movement of the load-carrying means 41 to be increased.

As is apparent from FIG. 10, the hydraulic power unit 48 corresponds to the unit 7 of FIG. 1 and to the unit 34e of FIGS. 4–7. This unit 48 can be used not only to turn the bell crank means to the load-receiving position of FIG. 10, but in addition when the parts are in the discharge mode of FIG. 9, the unit 48 can be extended so as to increase the height of the axis determined by the pivots 15 to an even greater extent. Thus in FIG. 9 it is possible to arrange the arm portions 50a so that they extend substantially vertically, if desired.

When the parts are in the mode of FIG. 10 for taking on a load, the hydraulic power units 43 together with the unit 48 if desired can be used to push the grabber into the load such as a pile of timber, so as to take the load up in a highly effective manner with the vehicle remaining stationary at this time if desired. In the event that the vehicle should be bogged down in soft muddy terrain or the like, then it is possible also at this time to use the power cylinders 43 as well as the cylinder 48 if desired to push the bell crank structure and load-carrying structure against suitable stationary obstacles for the purpose of moving the vehicle out of the soft muddy terrain.

The grabber 41 shown in the drawings has at its end distant from the pivots 15 a closing arm 52 capable of being turned about a pivot 54 connected to one end of the U-shaped frame structure 41, with a power unit 53 being used for this purpose. Thus the arm 52 can aid in moving the load into the load-carrier 41 and in the position of FIG. 8 will serve to close the opening between the front and rear portions of the frame 41 so as to hold the load properly.

Of course, a bell crank structure as described above and shown in FIGS. 8–11 may be used in the other embodiments. Moreover, where the load-carrying means takes the form of a grabber 41, it is not necessary to use the bell crank structure of FIGS. 8–11. For example it is possible to disconnect by way of the pivots 15 the container 1 of FIGS. 1–3 and to replace this container 1 with a grabber such as the grabber 41. Of course where the arm 14 is in the form of a single elongated body rather than a pair of pivotally connected arm portions the hydraulic units 43 are not required.

According to a further feature of the invention it is possible to increase the angle through which the load-carrying means 41 or any other load-carrying means is turned about the discharge axis 15. For this purpose a pair of links 46 are connected to the side members of the frame 41, and these links are in turn pivotally connected with a pair of intermediate bell cranks 45. Thus these bell cranks 45 may be pivotally connected at 55 to the arms 51b. As is shown in FIG. 11 it is possible to utilize only a single bell crank 45 and a single link 46 or as is shown in FIG. 9 a pair of these intermediate bell cranks 45 and a pair of the links 46 may be used. Hydraulic power units 44 are interconnected between the upper arm portions 51a and the intermediate bell cranks 45 in FIG. 9 while a single unit 44 is shown in FIG. 11 connected between the intermediate bell crank 45 and a bar extending between and fixed to the upper portions 51a of FIG. 11. Thus, by way of the hydraulic units 44 it is possible to turn the intermediate bell crank or bell cranks 45 about their axes 55 to provide movement of the link or links 46 to bring about an additional range of tilting of the load-carrying means 41. As is apparent from FIG. 11, the link 46 is connected by a pivot 57 with the load-carrying means 31 and by a pivot 56 with one arm of the intermediate bell crank 45. Of course in FIG. 11 a single rod 55 may extend between the arms 51b so as to form the pivot for the single bell crank structure 45 shown in FIG. 11. By appropriate choice of the lengths of the transmission 45, 46, particularly with regard to the lever lengths, it is possible with a relatively short range of movement of the power cylinder 44 to achieve a sufficiently large turning angle for the load-carrying means such as the timber grabber 41.

What is claimed is:
1. In a self-loading vehicle which is capable of taking on a load, transporting the load, and then discharging the load, elongated substantially horizontal frame means having a pair of opposed end regions, propelling means operatively connected to one of said end regions of said frame means for propelling the latter to cause the vehicle to travel, said propelling means including at least a pair of wheels for engaging the surface on which the vehicle travels, and at least one additional pair of wheels operatively connected with the other of said end regions of said frame means to support the latter during travel of the vehicle, bell crank means pivotally connected with said other end region of said frame means for turning movement with respect thereto about a substantially horizontal bell crank axis which extends transversely with respect to the direction of the vehicle travel, said bell crank means having a pair of elongated arm means which are substantially perpendicular to each other and which are connected to each other at the region of said bell crank axis, one of said arm means being an operating arm means which extends from said bell crank axis toward said one end region of said frame means in a substantially horizontal attitude when the vehicle is in a load-transporting mode while the other of said arm means is a carrying arm means which extends upwardly from said bell crank axis when the vehicle is in said load-transporting mode, load-carrying means pivotally connected to said carrying arm means for turning movement with respect thereto about a discharge axis which is parallel to said bell crank axis and which is situated at an elevation substantially higher than said bell crank axis when the vehicle is in said load-transporting mode, said load-carrying means having a load-carrying position where said load-carrying means extends at least in part from said discharge axis downwardly toward said operating arm means while the vehicle is in said load-transporting mode, bell-crank displacing means operatively connected between said operating arm means and said frame means for turning said bell crank means about said bell crank axis to a position where said operating arm means extends upwardly from said bell crank axis while said carrying arm means extends from said bell crank axis away from said one end region of said frame means to place the vehicle in a mode for taking on a load and to place said load-carrying means in a load-receiving position, and load-carrier displacing means operatively connected between said load-carrying means and said bell crank means for turning said load-carrying means about said discharge axis while said carrying arm means extends upwardly from said bell crank axis to place the vehicle in a load-discharging mode while turning said load-carrying means with respect to said bell crank means to a load-discharging position.

2. The combination of claim 1 and wherein said load-carrying means includes a container having a pair of opposed end walls which are parallel to the direction of vehicle travel and having between said end walls a pair of opposed transverse walls which extend in a generally upright direction when the vehicle is in said load-transporting mode, and said container having when the vehicle is in said load-transporting mode a bottom wall extending between the end and transverse walls for supporting a load in a space which is defined between said end and transverse walls, one of said transverse walls being situated between the other of said transverse walls and said one end region of said frame means when the vehicle is in said load-transporting mode and the other of said transverse walls being pivotally connected with said carrying arm means of said bell crank means for turning movement with respect thereto about said discharge axis, said load-carrier displacing means being operatively connected with said container for turning the latter about said discharge axis.

3. The combination of claim 1 and wherein said load carrying means includes a container having a pair of opposed end walls extending generally in the direction of the vehicle travel and at least one additional curved wall extending between said end walls and having an inner concave surface defining with the end walls the interior of the container, said curved wall having an exterior convex surface and having a radius of curvature whose center is in an axis which is parallel to said discharge axis, said load-carrying means further including curved guide rail means of the same curvature as said curved wall engaging said curved wall and guiding the latter for movement along said guide rail means, said curved guide rail means being pivotally connected to said carrying arm means for turning movement with respect thereto about said discharge axis and said load-carrier displacing means being operatively connected with said guide rail means for turning the latter and said container therewith about said discharge axis, and container-moving means operatively connected between said container and said curved guide rail means for moving said container with respect to said guide rail means to an extended position extending from said guide rail means when the vehicle is in said mode for taking on a load, said container-moving means also being operatively connected between said guide rail means and container means for retracting the latter back to a position with respect to said guide rail means suitable for carrying and transporting a load carried by said container means.

4. The combination of claim 1 and wherein said load-carrying means includes a container for receiving and carrying a load, load-moving means for moving a load into said container, linkage means carrying said load-moving means and connected to said operating arm means so that through said linkage means said load-moving means is connected with said bell crank means for turning movement therewith about said bell crank axis, and means operatively connected with said bell crank means, said linkage means, and said load-moving means for operating said linkage means and load-moving means to shift a load into said container when the vehicle is in said mode for taking on a load.

5. The combination of claim 4 and wherein said load-moving means is a scoop.

6. The combination of claim 1 and wherein said load-carrying means is a grabber means for grabbing and carrying a load.

7. The combination of claim 6 and wherein said grabber means includes a substantially U-shaped frame having one end portion pivotally connected to said carrying arm means for turning movement with respect thereto about said discharge axis and having an opposed end portion situated between said one end portion and said one end region of said frame means when the vehicle is in said load-transporting mode, and said grabber means including a load-displacing arm pivotally connected with said opposed portion of said U-shaped frame and a means connected to said load-displacing arm for swinging the latter with respect to said U-shaped frame for facilitating the self-loading operations of the vehicle.

8. The combination of claim 1 and wherein said load-carrying means includes a container situated between said carrying arm means and said one end region of said frame means when the vehicle is in said load-transporting mode, said container having a wall which is upright and situated closely adjacent to said carrying arm means in said load-transporting mode of the vehicle, and the latter wall being pivotally connected with said carrying arm means for turning movement with respect thereto about said discharge axis, said load-carrier displacing means being operatively connected with said container for turning said wall thereof about said discharge axis through approximately 180° to place the vehicle in its load-discharging mode with said container being situated in a load-discharging position, whereby said wall of said container becomes displaced from one side to the opposite side of said carrying arm means when moving between a load-carrying and a load-discharging position.

9. The combination of claim 1 and wherein said operating arm means of said bell crank means has in the load-transporting mode of the vehicle, elongated upper and lower portions situated next to each other and pivotally connected to each other at an end region of said operating arm means which is distant from said bell crank axis nearer to said one end region of said frame means than said bell crank axis when the vehicle is in said load-transporting mode, said portions of said operating arm means being pivotally connected to each other for turning movement one with respect to the other about an axis which is parallel to said bell crank axis, and said carrying arm means being connected only to said upper portion of said operating arm means while said lower portion of the latter forms the only part of said bell crank means which is connected to said frame means at said bell crank axis, and means connected between said portions of said operating arm means for moving them one with respect to the other away from and toward each other so as to extend the range of operation of said bell crank means.

10. The combination of claim 1 and wherein said load-carrier displacing means includes a link pivotally connected at one end with said load-carrying means, an intermediate bell crank pivotally carried by said bell crank means and pivotally connected at one end to an end of said link distant from said load-carrying means, and a turning means operatively connected with said intermediate bell crank at an end thereof distant from said link for acting through said intermediate bell crank on said link to turn said load-carrying means with respect to said discharge axis.

11. The combination of claim 1 and wherein a pivot means pivotally interconnects said load-carrying means with said carrying arm means for turning movement about said discharge axis, and said pivot means being operatively connected with said carrying arm means for disconnecting one type of load-carrying means therefrom and for connecting another type of load carrying means thereto.

* * * * *